United States Patent Office 3,705,042
Patented Dec. 5, 1972

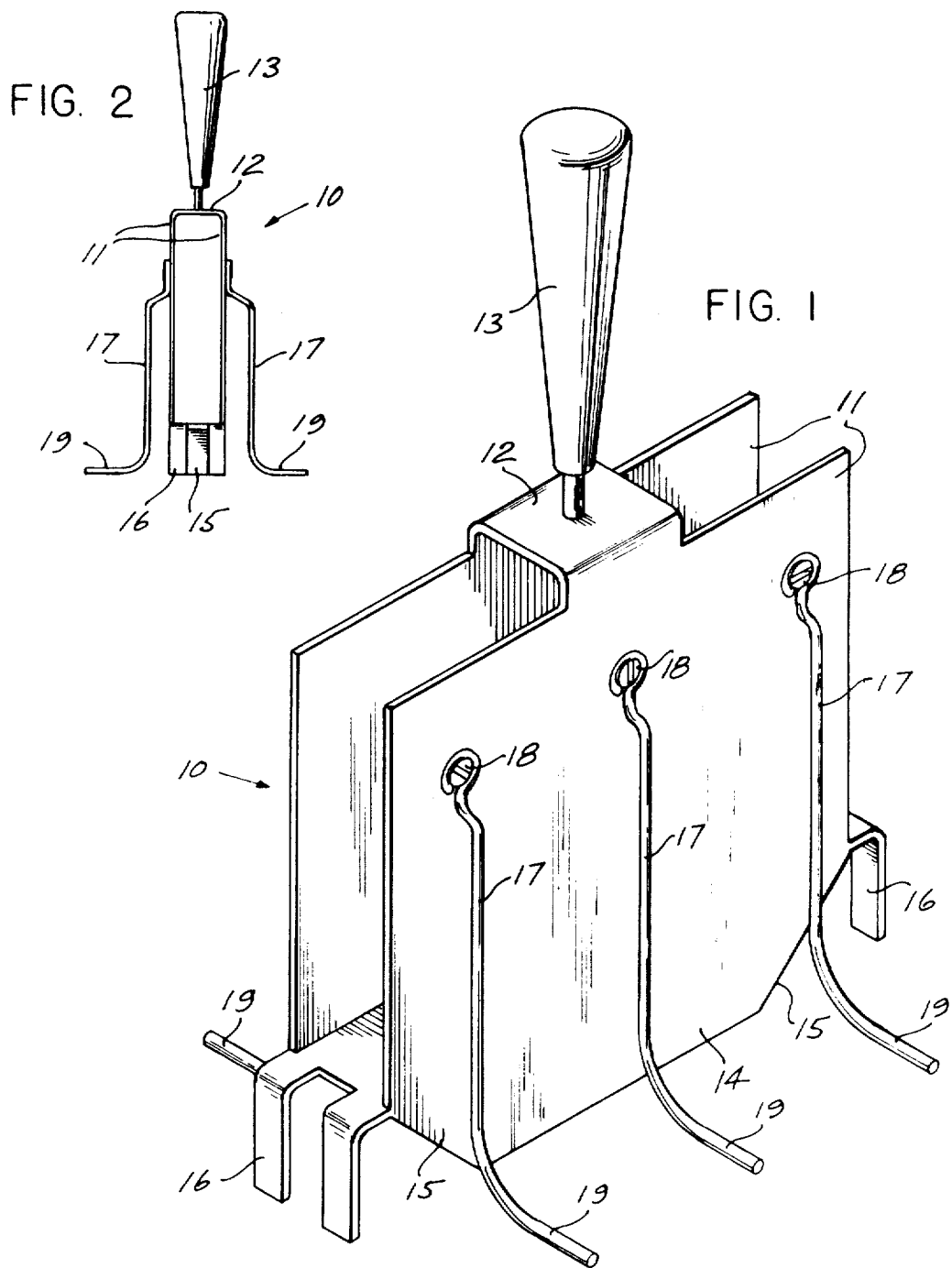

3,705,042
TACO SHELL JIG
Kenneth K. Muse, Star Rte., Worland, Wyo. 82401
Filed Dec. 10, 1971, Ser. No. 206,685
Int. Cl. A23p 1/00
U.S. Cl. 99—426
1 Claim

ABSTRACT OF THE DISCLOSURE

A device for shaping and holding a tortilla in taco shell form during cooking.

This invention relates to cooking implements, more particularly to devices for forming and holding a dough mix in a particular shape while cooking.

A principal object of the present invention is to provide a jig upon which a tortilla is folded and held in the shape of a taco shell during frying. A double walled frame bridged by a handle is used as a vertical base around which the tortilla is wrapped. Wire clips on the two faces hold the tortilla secure. The bottom of the frame is weighted to keep the jig at the bottom of the fryer.

Another object of the present invention is to provide a jig of the type described which has wire clips turned horizontally to support the jig in a vertical position during filling and serving.

Another object of the present invention is to provide a jig that fries the shell open which enables easy filling without breaking the shell.

Another object of the present invention is to provide a jig that is designed to form pockets for holding the taco filling during serving and eating.

These and other objects will be readily evident upon a study of the following specification and the accompanying drawing wherein:

FIG. 1 is a perspective view of the jig.
FIG. 2 is a side elevation view.

Referring to the figures the jig 10 comprises two parallel plates 11 joined at the top by a bridge piece 12 in which a heat-insulated handle 13 is fixed. The bottom portion of the space between plates 11 is bridged with a solid metal block 14 forming a base with angled ends 15 and extending into a pair of slotted, bent flanges 16.

As set of wire arms 17 attached to plates 11, for example, by screws 18 are disposed close to the plates and terminate in bends 19 which serve as supports.

In use, the tortilla is folded in half, slipped over base 14 and tucked between plates 11 and wire arms 17. If pockets are desired, for fillings, the tortilla ends are folded onto the angled ends 15 under flanges 16. The jig is now ready for insertion in the fryer.

What I now claim is:

1. A taco shell cooking jig comprising a pair of vertically displaced parallel plates bridged by a handle at the top and by a weighted block at the bottom, wire arms attached near the top of said plates disposed vertically and close to said plates extend to the bottom of said weighted block, there bent out horizontally a short distance to keep said jig from tipping, said weighted block leveled at the ends and extending into bent, slotted flanges for forming pockets at each end of the taco shell for filling.

References Cited
UNITED STATES PATENTS

| | | | |
|---|---|---|---|
| 2,792,774 | 5/1957 | Veach | 99—426 |
| 2,814,981 | 12/1957 | Wendel | 99—426 |
| 2,847,933 | 8/1958 | Pate | 99—426 |
| 2,957,404 | 10/1960 | Richardson | 99—426 |
| 3,332,340 | 7/1967 | Wirtz et al. | 99—426 |
| 3,555,993 | 1/1971 | Garcia | 99—426 |

BILLY J. WILHITE, Primary Examiner
A. O. HENDERSON, Assistant Examiner

U.S. Cl. X.R.
99—353